April 26, 1966 F. H. REES 3,248,564

LOGICAL CIRCUITRY FOR DIGITAL SYSTEMS

Filed Nov. 20, 1962 8 Sheets-Sheet 1

United States Patent Office 3,248,564
Patented Apr. 26, 1966

3,248,564

LOGICAL CIRCUITRY FOR DIGITAL SYSTEMS

Frederick Henry Rees, London, England, assignor to International Standard Electric Corporation, New York, N.Y., a corporation of Delaware
Filed Nov. 20, 1962, Ser. No. 238,941
Claims priority, application Great Britain, Dec. 7, 1961, 43,899/61
18 Claims. (Cl. 307—88.5)

The present invention relates to electronic digital circuits using transistors.

According to the present invention there is provided an electrical logical circuit, which comprises a transistor connected in the common emitter configuration, a bias connection to the base of said transistor over which pulses may be applied to said base, the polarity of said pulses being such as to cut said transistor off, an input connection to said base via which pulses of the opposite polarity to said base pulses may be applied to said base, a pulse applied to said base over said input connection being coincident with and having an amplitude such that it over-rides the effect of the bias pulse, an output connection from collector of said transistor, and an interrogation input via which a pulse of said second polarity can be applied to said collector at a time between two of the bias pulses applied to said base, the arrangement being such that, due to charge storage in the base region of the transistor, an interrogation pulse applied to said collector produces no output pulse on said output connection if an input pulse was applied to said base at the same time as the immediately preceding bias pulse, but produces an output pulse on said output connection if no such input pulse occurred.

The invention will now be described with reference to the accompanying drawings, in which:

FIG. 1 is a circuit according to the present invention, which circuit will be referred to in the present specifications as a delay unit or delay inverter, FIG. 2 shows a delay unit as in FIG. 1, in conjunction with a buffer unit, FIG. 3 shows a delay line formed by delay units and buffer units connected alternately in cascade, FIG. 4 is another delay line, but with delay units resistor-coupled, FIG. 5 is a voltage inhibiter unit, which consists, in effect of a delay unit preceded by an "inhibiting" gate.

FIGS. 14 and 15 show pulse waveforms for two and three phase operation respectively while

Figure 1:
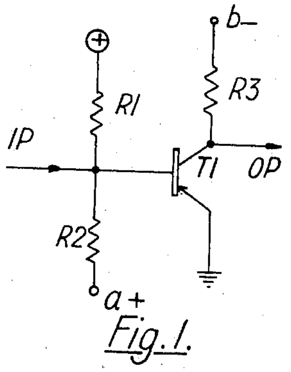

The operation of the individual circuit unit to be described herein occurs in a two-phase manner, the phases, which are of equal duration, being designated *a* and *b* respectively.

The invention is based on certain aspects of the phenomena of hole storage and decay in the base region of a transistor. Where a space charge exists in the base region of a p-n-p transistor, the application of a positive potential to its base acts to withdraw current from the base since that positive potential accelerates the rate at which decay of the holes occurs. It should be noted that hole decay occurs in the absence of such an applied voltage, but the rate at which space charge due to holes decays is increased by the application of positive potential since the positive potential repels holes from the base region.

Now if a negative pulse is applied to the base, a space-charge (holes) is set up in the base region of the transistor since the current flow due to the pulse over-rides the effects of the decay mentioned previously. Hence the negative pulse, if of suitable amplitude, produces a net increase in the base charge. However, if a stream of negative pulses is applied to the base, although each one produces a net increase in the base charge, the base charge is unable to increase above a limiting value which depends on the parameters of the transistor and of the associated circuitry. This limiting value exists because the rate at which holes decay is determined by an exponential law, so that for high values of charge the decay rate is greater than for low values of charge.

As a consequence of the above phenomenon a "two-phase" circuit operation is possible, the two phases designated *a* and *b* being assumed to be of equal duration.

A circuit arrangement used to delay information signals from the *a* phase to the *b* phase will now be discussed. During phase *a* a positive bias pulse is applied to the transistor's base, which pulse supplies the withdrawal current which (as mentioned above) accelerates the rate at which any holes in the base region decay. If an input negative pulse occurring in phase *a* is applied to the base simultaneously with the positive bias pulse (also in phase *a*) this negative pulse having such a value as to over-ride the effect of the positive pulse, it has the effect of leaving the collector of the transistor bottomed when a pulse in phase *b* ends. That is, it bottoms the collector, and the bottoming is such that when a pulse occurring in phase *b* has ended the transistor collector is still bottomed.

Consequent on the above action, if a negative pulse is applied to the collector of the transistor during the *b* phase *following* an *a* phase in which a negative pulse was applied to its base, no collector output appears. However, had there been no negative pulse during the previous *a* phase, then the negative collector pulse would have produced an output pulse from the collector.

The phenomenon described above is frequency dependent, so that for any given transistor there is a certain frequency range within which this effect can be exploited. The hole decay rate can be altered by altering the potential conditions on the base of the transistor, and in the circuits to be subsequently described the transistors have direct current bias (positive for a p-n-p transistor) applied to their base electrodes in addition to the positive bias pulses each of which occurs at the time at which a (negative) data pulse can occur. This positive direct current bias helps to determine the operating conditions of the circuit. However, in some cases it may be possible to use only the positive pulse bias.

It should be noted that the effect of the base biasses, pulses alone or pulses plus D.C. bias, is to cause the space charge in the base region to decay in an accurately determinable manner, the decay rate being dependent on the characteristics of the transistor and its associated circuit elements. Each negative pulse when applied to the base in coincidence with a positive bias pulse over-rides the effects which produce the hole decay and increases the base space charge. The parameters are so chosen that if a pulse is applied to the transistor collector immediately after the ending of the base pulses, a collector output pulse is *only* produced if no negative pulse were applied to the base at the same time as the positive bias pulse. This is because the build up of the chargers by a series of input pulses is limited to such a value that one positive pulse which is not over-ridden, together with any direct current biasses present, and with the decay due to combination of holes and electrons, is sufficient to reduce the charge in the base region to zero within one phase time.

Individual delay units such as briefly described above, working from phase $a$ to phase $b$ and from phase $b$ to phase $a$, can be used in conjunction with diode gating, resistor gating or mixed diode-resistor gating, and with buffers.

Turning now to FIG. 1, the transistor T1 has an input IP to its base, to which is applied a positive D.C. bias via resistor R1 and a pulsed bias $a+$, via resistor R2. The bias source $a+$ supplies pulses which are positive in phase $a$ and zero in phase $b$. The collector supply, via resistor R3, is a pulse supply $b-$ which is negative in phase $b$ and zero in phase $a$.

In the absence of any input on IP, the combined effect of the D.C. bias and of $a+$ is that holes are driven away from the base during the $a$ phase. If a negative pulse, as sumed to represent the binary digit 1, occurs on IP, it over-rides the positive potentials applied to the base of T1, and attracts holes from the emitter. That is, an emitter-base current flow occurs. Due to the hole storage phenomenon, when the negative pulse ends the base remains charged. When the collector pulse, referred to above as the interrogating pulse, occurs in the $b$ phase, T1 conducts so that there is no output current pulse at OP. That is, substantially all of the current due to the pulse $b-$ flows in T1. However, had there been no negative pulse, representing binary 0, during phase $a$, the negative pulse on the collector would not cause T1 to conduct so that a pulse of current appears at OP. That is little or no current from $b-$ is diverted via T1 and all is available at OP.

Thus a pulse in phase $a$ representing 1, produces no pulse in phase $b$ whereas no pulse in phase $a$, representing 0, produces a pulse in phase $b$. As used in binary circuits, a negative pulse in phase $a$ and no pulse in phase $b$ correspond to binary 1, while no negative pulse in phase $a$ and a pulse in phase $b$ correspond to binary 0. Since the circuit causes a delay and also interchanges "pulse" and "no pulse" conditions (this latter being logical inversion), it is referred to as a delay unit or a delay inverter.

The rate at which the charge set up in the base decays after the termination of the pulse which establised that charge can (as already mentioned) be accurately predicted since it depends on the parameters of the transistor used and on the values of the voltages applied to the circuit. The prediction is based on a mathematical analysis of these parameters, but the analysis has not been included in the present specification.

In some cases it may be preferable for the D.C. bias and the pulse bias for the base to be applied in common via the same resistor. In such a case a single circuit unit (not shown) can be used to produce the "pulse plus bias" supply for several delay units.

Figure 2:
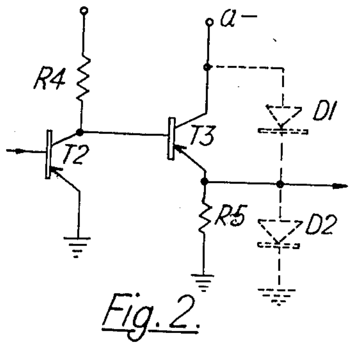

FIG. 2 shows a delay unit using transistor T2 which is followed by a transistor T3, connected as a buffer. The delay unit transistor T2 has a collector resistor R4 whose value is larger by a constant A than is the collector resistor normally used in a delay unit, and the voltage applied via R4 to T2 is larger, also by the constant A, than is the collector voltage supply used in the simple delay unit. The constant A has a value greater than unity so that when the stage is loaded the voltage drop across R4 does not bring the voltage applied to the base of the buffer to a value less than $a-$.

The $a$-supply consists of pulses, being negative in the $a$ phase and zero in the $b$ phase, their magnitude being the same as that of the $b$ pulses.

The buffer T3 is a simple emitter-output circuit whose parameters are such that it is saturated when it is passing a pulse.

The buffer can be provided with a diode as indicated at D1, which serves to accelerate the decay of charges on the capacity of the output connection due to an output pulse. This diode is not always necessary. In addition, a further diode as shown at D2 can be provided, this diode, which replaces resistor R5, serving to by-pass any positive-going feedback. Where the feed to the delay units is via diodes, there is no need for a diode such as D2.

A buffer such as that shown in FIG. 2 can feed up to eight outputs.

Figure 3:
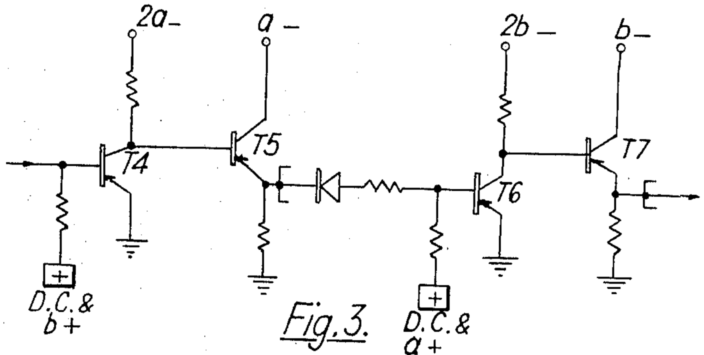

FIG. 3 shows a chain of alternate delay units and buffers, and it will be seen that the delay unit T4 has its base biasses from D.C. and $b+$, whereas the next delay unit T6 has its base biasses from D.C. and $a+$. The $a+$ pulses are positive in $a$ phase and zero in $b$ phase and the $b+$ pulses are positive in $b$ phase and zero in $a$ phase. Similarly the collector supplies are respectively from $2a-$ and $2b-$: i.e. in this case $A=2$ (see above). Correspondingly it will be seen that the collector supplies to the buffers alternate between $a-$ and $b-$.

Figure 4:
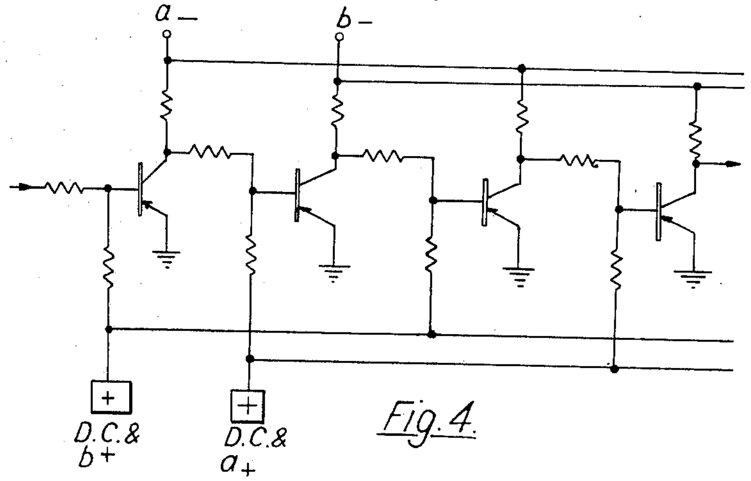

FIG. 4 shows a chain of delay units which are interconnected by simple resistor couplings.

Delay units such as described can be used for providing delays of defined duration, such as half a digit period, using one unit, a full digit period using two units, and so on. In addition, the units can be used as a recirculatory store by connecting the last unit of the chain to the first. Hence it is possible to assemble a delay line store (such as used in computers) from a suitable number of delay units interconnected as just described.

Figure 5:
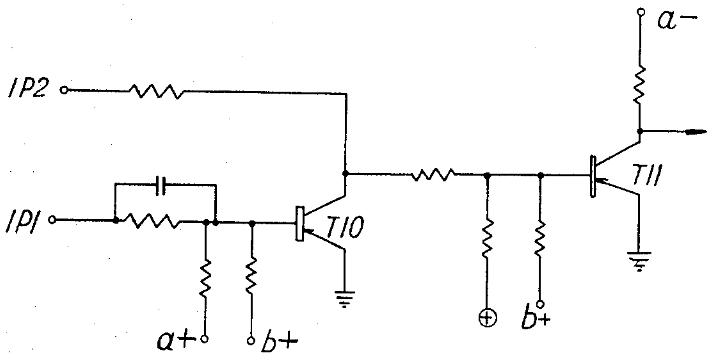

The circuit in FIG. 5, consists of a first transistor T10, which is, in effect, an inhibiting gate, followed by a transistor T11 acting as a delay unit (as already described). The gate has a base input IPI via a parallelled R-C combination, the capacitor serving to speed the response of the circuit to pulses, over which a negative signal at $b$ phase can be received. In addition there is a collector input IP2 via which the $b-$ waveform is supplied. It will be seen that this circuit gives a collector output only in the absence of an input on IPI. The combination of this inhibiting gate with a delay unit is referred to as a voltage inhibit-unit.

Figure 6:
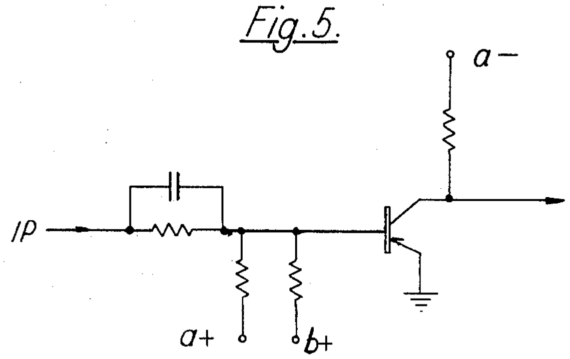
FIG. 6 is a grounded-emitter buffer, which is generally similar to the "inhibiting" gate used in FIG. 5.

FIG. 6 is a grounded emitter buffer unit which is derived from the inhibiting gate portion of the voltage inhibiting unit. It can be used in conjunction with delay units for buffering.

The delay units can, as already mentioned, be coupled in many different ways, including resistor and diode coupling. Where diodes are used to couple two delay units, if silicon diodes are used, see FIG. 7, the bend in the forward characteristic of a silicon diode can be exploited such that the transistor T12 bottoms when it conducts and T13 is the cut off.

Figure 7:
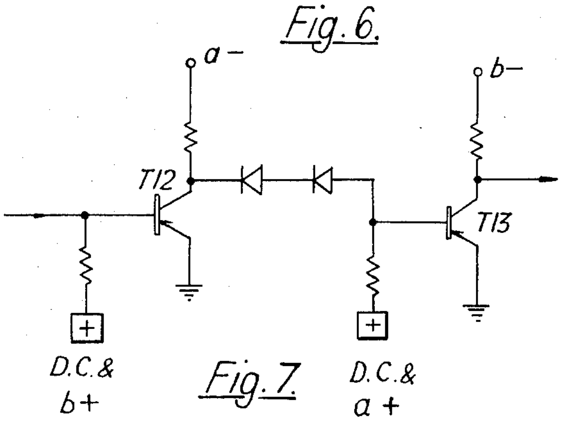
FIG. 7 shows two delay units coupled in series by diodes.

The second of the diodes shown in FIG. 7 can be replaced by a resistor to give a mixed diode-resistor coupling. One diode alone could be used in certain circumstances. Also the delay units can be A.C. coupled, when the first diode is replaced by a capacitor. In this case, the capacitor-diode junction is "caught" via another diode at a suitable D.C. level e.g. at +1 volts. Where the delay units are used in conjunction with resistor gating, only a limited number of gate inputs can be used, and in addition no two inputs should carry signals at the same time.

Figures 8, 9:
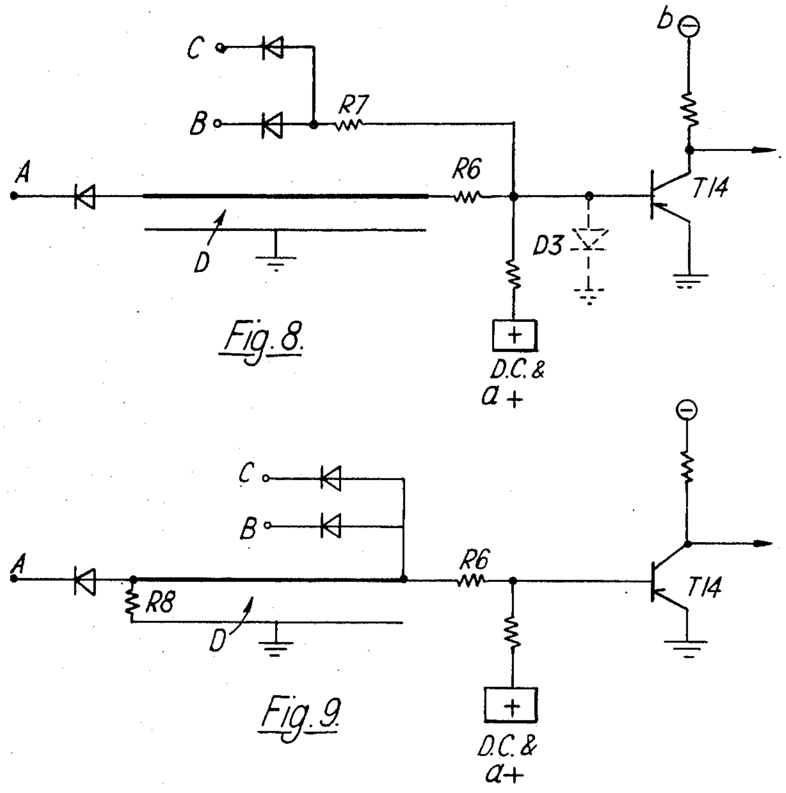
FIGS. 8, 9, 10, 11, 12 and 13 show various combinations of circuits of the FIG. 1 type with delay cables.
Figure 10:
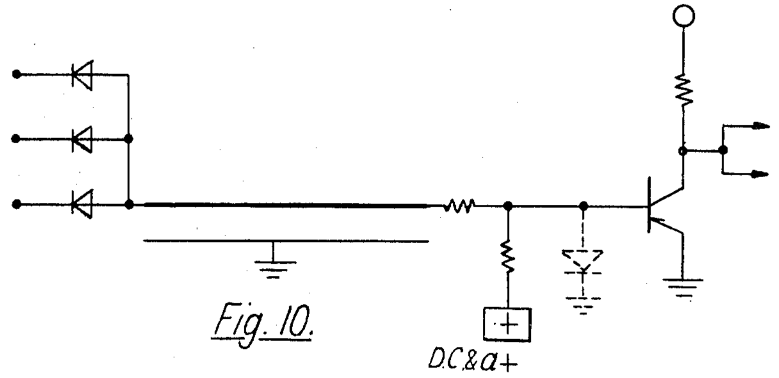

In the circuit of FIG. 8 there are three inputs to the base of the transistor T14. The first of these, input A, is conected via a length of a delay cable D, which introduces a delay equal to the time between two $a$ pulses or $b$ pulses. The cable is terminated by a resistor R6 of value $Zo$ (the characteristic impedance of the cable D). By introducing a delay as just described without voltage inversion, logical inversion is effected.

The other two inputs, B and C, are applied via decoupling diodes and a resistor R7, equal in value to R6, to the base of the transistor. A data pulse on A is at $b$ phase while one at B or C at the $a$ phase time position which follows the $b$ phase time position for the A input. Consequently the output from the transistor represents $(\overline{A}+B+C)$, i.e. not A, or B, or C, and occurs at the $b$ phase time following that for which the A input is effective. In this, of course, the output is "no pulse" for 1 and "pulse" for 0, as in the circuits already described.

The semiconductor diode shown in dotted lines at D3 reduces the effect of reflections in the delay cable on the operation of the circuit but will not always be needed.

If a circuit generally similar to FIG. 8 has the base bias supplied by D.C. and *b*+ pulses, the collector supply being *a*− pulses a slightly different logical circuit is produced. In this case the A input occurs at an *a* phase, designated *a*1, and the B and C inputs occur at the next *b* phase, or *b*1. The output then represents ($\bar{A}BC$) at phase *a*2 if one does *not* regard no output from the transistor as being 1.

In the circuit of FIG. 8, the resistors R6 and R8 both have value Z*o*, and the delay cable D introduces a delay $T_D$, where.

$$0 < T_D < \frac{T_P}{2}$$

where $T_P$ is the time of one complete cycle of the power supply. This arrangement enables the standard delay voltage inverter to have improved "fan-out" possibilities.

Figure 11:
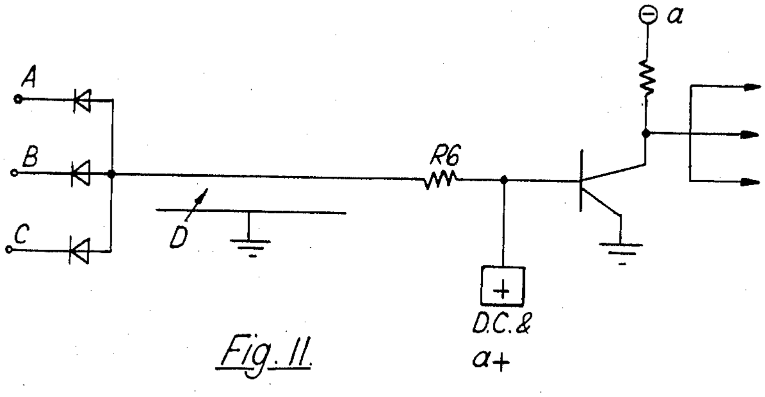

FIG. 11 represents one stage in a system in which the three inputs A, B and C, on which pulses (if any) are assumed to occur at an *a* phase, are connected to the input end of a delay cable whose length is such that it introduces a delay time longer than $T_p/2$ but less than $T_p$. With such an arrangement the output represents $(A+B+C)$, i.e. inclusive OR, or (ABC), i.e. AND, depending on how the device is used.

Thus if on the input "pulse" represents 1 and "no pulse" represents 0, then the device is OR, but with output representation inverted. This could be regarded as NOR if no inversion of representation is involved. If "pulse" on the input represents 0, however, thus we have AND, three 1 inputs each represented by no pulse at *a* causing a pulse output at the next *a* phase.

This arrangement allows the production of a single phase logical system in which the input gates alternate between AND and OR.

Figure 12:
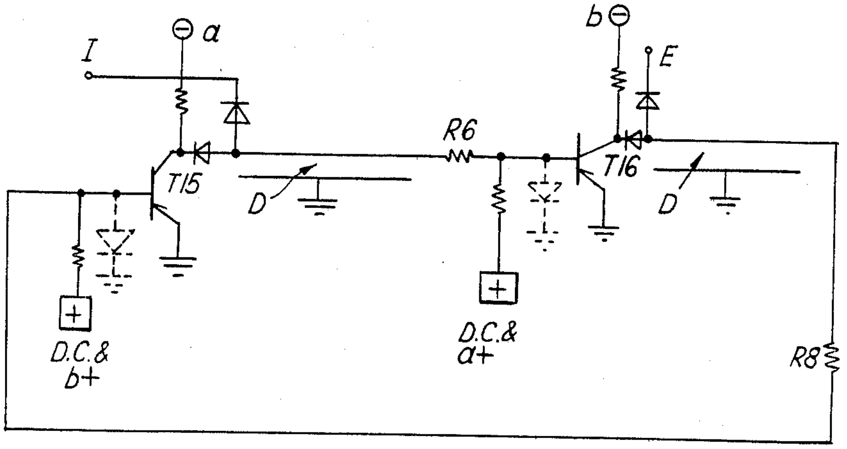
Figure 13:
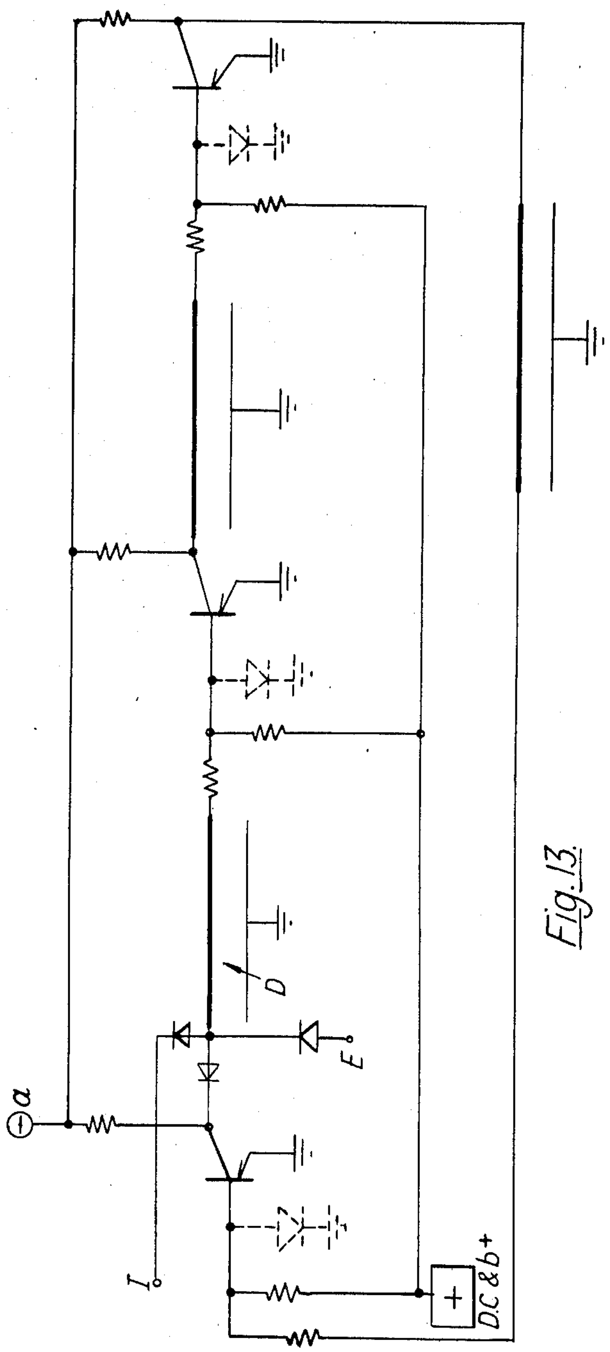

FIGS. 12 and 13 show two circuits in which longer lengths of delay cable are used each of which interconnects two stages of a circulatory store. In FIG. 12, I is the data input and E an erase input, while R6 and R8 are resistors of value Z*o*. The operation of this circuit should be clear as a result of the preceding description. FIG. 13 is a "single phase" system in which different lengths of cable from those used in FIG. 12 are used. In both of these circuit diagrams, "anti-reflections" diodes are shown dotted.

Figure 14:
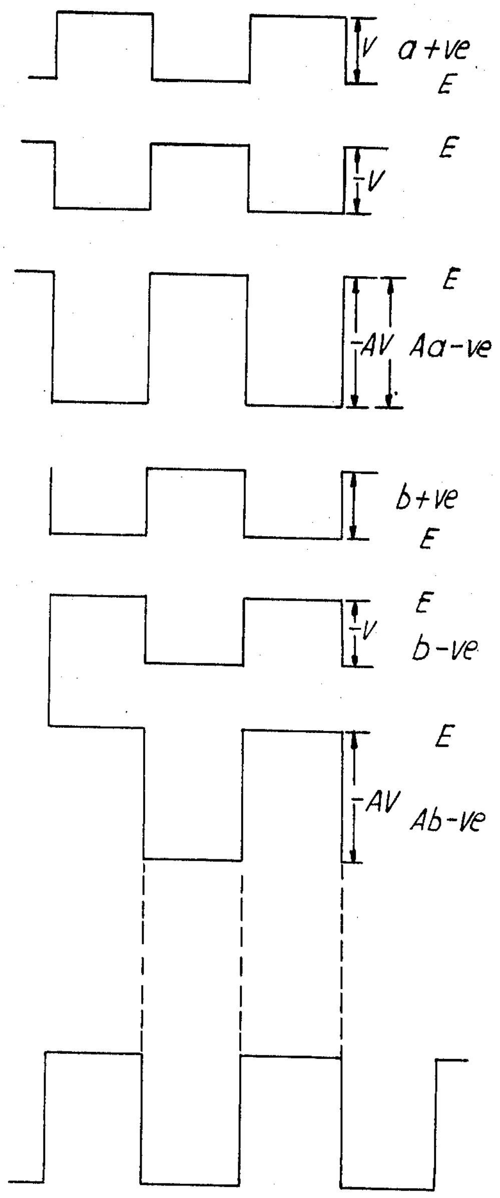

The arrangements so far described mostly use two-phase pulse supplies, the pulse waveform being as in FIG. 14, in which the bottom-most wave-form is the one from which all the others are derived.

Figure 15:
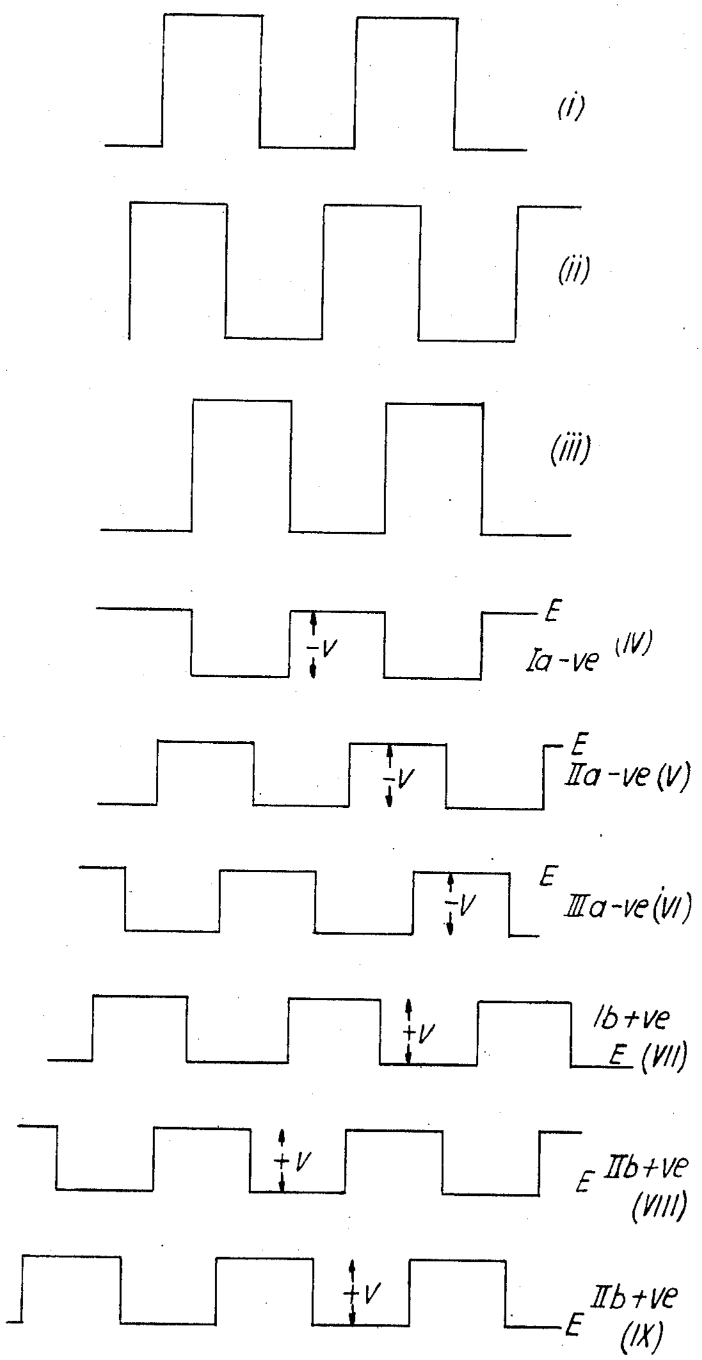

For a three-phase system waveform such as shown in FIG. 15 are usual. In this figure lines (III), (II) and (I) respectively represent waveforms I, II and IV, from which the other six pulse waveforms are derived. These are three negative going waveforms I*a*, II*a* and III*a* shown in lines (IV), (V) and (VI) respectively and three positive-going waveforms I*b*, II*b* and III*b* shown in lines (VII), (VIII) and (IX) respectively. Positive-going *a* waveforms and negative-going *b* waveforms (if needed) can be produced from these by simple inversion.

Figure 16:
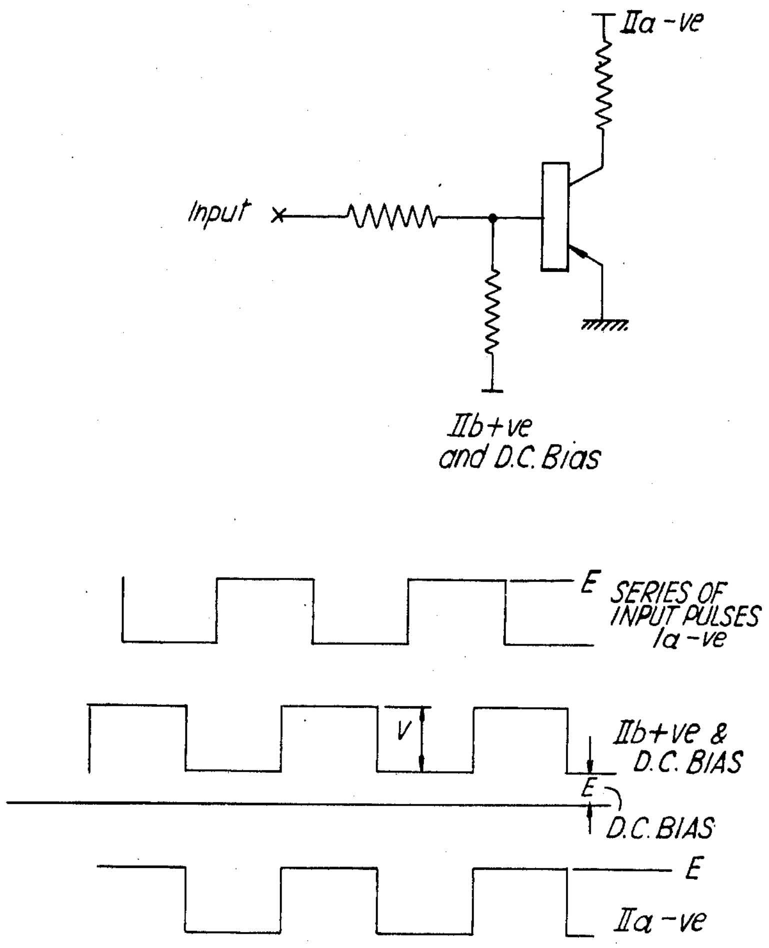
FIG. 16 is a circuit for three phase operation with explanatory waveforms.

FIG. 16 shows a simple buffer inverter forming part of a three phase system, with some explanatory waveforms.

Diode gating can be used with the circuit of FIG. 16 as can the delay line techniques already described.

Where four-phase operation is desired two main supply waveforms would be used.

Waveforms other than rectangular (as described), such as sinusoidal, can be used.

Finally it should be noted that where n-p-n transistors are used all polarities are reversed as compared with the circuit elements which have been described. Units employing p-n-p transistors can, of course, be used in conjunction with units employing n-p-n transistors.

It is to be understood that the foregoing description of specific examples of this invention is not to be considered as a limitation on its scope.

What I claim is:

1. An electrical logical circuit, which comprises a transistor connected in the common emitter configuration, a bias connection to the base of said transistor over which pulses may be applied to said base, the polarity of said pulses being such as to cut said transistor off, an input connection to said base via which pulses of the opposite polarity to said bias pulses may be applied to said base, a pulse applied to said base over said input connection being coincident with and having an amplitude such that it over-rides the effect of the bias pulse, an output connection from the collector of said transistor, and an interrogation input via which a pulse of said second polarity can be applied to said collector at a time between two of the bias pulses applied to said base, the arrangement being such that, due to charge storage in the base region of the transistor, an interrogation pulse applied to said collector produces no output pulse on said output connection if an input pulse was applied to said base at the same time as the immediately preceding bias pulse, but produces an output pulse on said output connection if no such input pulse occurred.

2. An electrical logical circuit, which comprises a p-n-p transistor connected in the common emitter configuration, bias connections to the base of said transistor via which a positive D.C. bias and positive-going pulses may be applied, so that said transistor is normally cut off, an input connection to said base via which negative-going pulses may be applied to said base, a negative-going pulse being concident with one of said positive-going pulses and having an amplitude such that it over-rides the effect of the positive bias on said base, an output connection from the collector of said transistor, and an interrogation input via which a negative-going pulse can be applied to said collector at a time between two of the bias pulses applied to said base, the arrangement being such that, due to charge storage in the base region of the transistor, an interrogation pulse applied to said collector produces no output pulse on said output connection if a negative-going input pulse were applied to said base at the same time as the immediately preceding bias pulse, but produces negative-going output pulse if no such input pulse occurred.

3. An electrical logical circuit as claimed in claim 2, and in which the pulses applied via said interrogation input to the collector of the transistor are applied thereto via a resistor and form the sole power supply for the collector of said transistor.

4. An electrical logical circuit, which comprises a p-n-p transistor connected in the common-emitter configuration with its emitter earthed, bias connections to the base of said transistor via which a positive D.C. bias and positive-going pulses may be applied to said base, said D.C. bias and said pulses being applied via resistive impedance to said base, an input connection to said base via which negative-going pulses may be applied to said base, a negative-going pulse being coincident with one of said positive-going pulses and having an amplitude such that it over-rides the effect of the positive bias on said base due to the D.C. bias and the positive pulse, a connection including resistive impedance from a pulse source which supplies negative-going pulses to the collector of said transistor, the pulses from said negative pulse source each occur in the gap between two of said positive pulses and said negative pulse source forming the only collector supply for the transitor, and an output connection from the collector of said transistor, the arrangement being such that, due to charge storage in the base region of said transistor, a negative-going pulse applied to said collector saturates the transistor and gives substantially no output pulse on said output connection if a negative-going input pulse was applied to said base coincident with the immediately-preceding positive-going pulse, but that a pulse on said collector is unable to cause said transistor to conduct if no negative-going pulse was applied to the base of said transistor coincident with the preceding positive-going pulse, in which case an output pulse occurs on said output connection.

5. An electrical circuit arrangement which comprises a logical circuit as claimed in claim 4, and a grounded-emitter transistor buffer whose base is connected to the collector of the transistor in said logical circuit, the resistor or the resistive impedance in the collector circuit of said logical circuit's transistor being larger by a factor A than that used for logical circuit in the absence of a buffer, and the pulses applied to said collector having a voltage A times greater than that used for a logical circuit without a buffer.

6. An arrangement as claimed in claim 5, and in which said buffer has its emitter grounded via a resistive impedance, the output being taken from the emitter of the buffer.

7. An arrangement as claimed in claim 5, and in which said buffer has its emitter grounded via a semiconductor diode, the output being taken from the emitter of the buffer, said diode acting as a by-pass for positive feedback.

8. An arrangement as claimed in claim 6, and which comprises a semiconductor diode connected between the emitter and the collector of the buffer transistor which diode serves to accelerate the decay of charges due to an output pulse on the output connection of said buffer.

9. An electrical delay line which comprises a chain of circuit arrangements each as claimed in claim 5, in which the output from each said buffer is connected to the base of the next circuit arrangement's logical circuit transistor, and in which the collector pulses of each logical circuit transistor are in synchronism with the base bias pulses of the next logical circuit transistor.

10. An electrical delay line as claimed in claim 9, and in which each connection from a buffer output to a logical circuit input includes a semiconductor diode and a resistor in series, said diodes acting as interstage decouplers.

11. An electrical delay line which comprises a chain of circuit arrangements each as claimed in claim 5, in which each said buffer has its emitter earthed directly, in which the base bias pulses of all logical circuit transistors are in synchronism with the collector inputs of all buffer transistors, in which each buffer transistor has resistive impedance in its collector circuit, and in which each buffer transistor-logical circuit interconnection is a resistive impedance connected between a buffer collector and a logical circuit base.

12. A recirculatory storage circuit, which comprises a delay line as claimed in claim 5, a connection from the output of the last buffer to the input to the first logical circuit, one or more input connections the or each of which is connected to a logical circuit's base, and one or more output connections the or each of which is connected to a buffer's output connection.

13. An electrical circuit arrangement which comprises a first transistor whose emitter is grounded and whose collector is connected via a resistive impedance to a source of pulses of a first polarity suitable for conduction in the transistor, a connection from the base of said transistor to an input on which pulses of said first polarity can occur, a pulse reaching said base being coincident in time with a pulse applied to said collector, a connection from said base to a source of pulses of a second polarity each of which coincides with a pulse on said collector, the arrangement being such that an output pulse can only be obtained from said collector when a pulse occurs on said collector but not on said input to said base, such an output pulse being of said first polarity, a second transistor connected in the grounded-emitter configuration whose base is connected via a resistive impedance to the collector output of said first transistor, connections from said second transistor's base to a source of D.C. bias of said second polarity and a further pulse source which emits pulses of said second polarity each of which coincides with pulses applied to the collector of said first transistor, a connection from the collector of said second transistor via a resistive impedance to a pulse source which emits pulses of said first polarity each of which occur between two of the pulses applied to the collector of said first transistor, which pulse source is the sole power supply for said second transistor's collector, and an output connection from said second transistor's collector, the arrangement being such due to charge storage in the base region of said second transistor, that when an output pulse from said first transistor is applied to said second transistor's base no output occurs from said second transistor's collector when a pulse is applied thereto, but an output pulse occurs on said second transistor's output connection when a pulse on that transistor's collector was not immediately preceded by a pulse on its base from said first transistor.

14. An electrical circuit network comprising a number of logical circuits each as claimed in claim 1, internected so that some at least of those circuits feed others of said circuits, said circuit network operating in a two-phase manner with alternate logical circuits out of phase.

15. A logical circuit as claimed in claim 1 and which comprises a length of delay cable connected to the base of the transistor, said delay cable having a length such as to shift a pulse from an input pulse time to a collector pulse time, whereby said delay cable acts as a logical inverter.

16. A circuit as claimed in claim 15, and which comprises additional inputs to the base of the transistor whereby logical operations may be performed.

17. A circuit as claimed in claim 15, modified in that said delay cable is lengthened.

18. A circulatory store which comprises a series of circuits each as claimed in claim 15 connected in series.

References Cited by the Examiner

UNITED STATES PATENTS

| | | | |
|---|---|---|---|
| 2,866,105 | 12/1958 | Eckert | 307—88.5 |
| 3,001,089 | 9/1961 | Tulp | 307—88.5 |
| 3,038,084 | 6/1962 | Demiranda et al. | 307—88.5 |
| 3,050,640 | 8/1962 | Dillingham et al. | 307—88.5 |

ARTHUR GAUSS, *Primary Examiner.*

J. BUSCH, *Assistant Examiner.*